United States Patent
Cousinard et al.

(10) Patent No.: US 9,391,452 B1
(45) Date of Patent: Jul. 12, 2016

(54) METHOD AND APPARATUS FOR IMPLEMENTING POWER LINE COMMUNICATIONS OVER A DC POWER SUPPLY CABLE

(75) Inventors: David Cousinard, Morges (CH); Lydi Smaini, Lausanne (CH); Daniel Castelo da Silva, Etoy (CH)

(73) Assignee: Marvell International Ltd., Hamilton (BM)

( * ) Notice: Subject to any disclaimer, the term of this patent is extended or adjusted under 35 U.S.C. 154(b) by 1108 days.

(21) Appl. No.: 13/449,633

(22) Filed: Apr. 18, 2012

Related U.S. Application Data (60) Provisional application No. 61/480,226, filed on Apr. 28, 2011, provisional application No. 61/522,176, filed on Aug. 10, 2011.

(51) Int. Cl.
*H02J 1/00* (2006.01)
*H04B 3/54* (2006.01)
*H04B 13/00* (2006.01)

(52) U.S. Cl.
CPC ... *H02J 1/00* (2013.01); *H04B 3/54* (2013.01); *H04B 13/00* (2013.01)

(58) Field of Classification Search
CPC ................ H03H 7/00; H02J 1/00; H02J 3/00
USPC ............................................................. 307/1
See application file for complete search history.

(56) References Cited

U.S. PATENT DOCUMENTS

| | | | | |
|---|---|---|---|---|
| 7,227,550 | B2 * | 6/2007 | Pasqualini | G09G 5/003 345/204 |
| 8,089,176 | B2 * | 1/2012 | Sasaki | H04B 3/54 307/1 |
| 8,610,317 | B2 * | 12/2013 | Tsai | G06F 1/26 307/151 |
| 2003/0002572 | A1 * | 1/2003 | Hoobler | H04L 7/044 375/222 |
| 2004/0130413 | A1 * | 7/2004 | Mentz | H04B 3/56 333/167 |
| 2007/0168596 | A1 * | 7/2007 | Hall | H04L 12/10 710/313 |
| 2010/0150556 | A1 * | 6/2010 | Soto | H04M 19/08 398/66 |

FOREIGN PATENT DOCUMENTS

GB        2485781 A * 5/2012 ............... H04B 3/54

* cited by examiner

*Primary Examiner* — Rexford Barnie
*Assistant Examiner* — Joseph Inge (57) ABSTRACT

Devices and systems for providing reduced cost and increased reliability power line communications (PLC) and electrical power to a network device using a PLC supply unit via a single cable with 2 wires are disclosed. The PLC supply unit receives a PLC power and data signal, extracts the power signal, the data signal and generates a timing signal based on the power signal. The PLC supply converts the electrical power signal from an alternating current (AC) to a direct current (DC) electrical power signal and then recombines the DC electrical power signal with the data signal and the timing signal and sends the composite signal to the network device. The network device receives the composite signal and uses the DC electrical power signal to power the network device and, at an internal PLC processing module, processes the data signal for communication with other network devices using the timing data.

20 Claims, 9 Drawing Sheets

METHOD AND APPARATUS FOR IMPLEMENTING POWER LINE COMMUNICATIONS OVER A DC POWER SUPPLY CABLE

CROSS REFERENCE TO RELATED APPLICATIONS

The present disclosure claims priority to U.S. Provisional App. No. 61/480,226 for "Power Line Communications over DC power supply cable" filed Apr. 28, 2011, and U.S. Provisional App. No. 61/522,176 for "Power Line Communications over DC power supply cable" filed Aug. 10, 2011, both of which are incorporated herein by reference in their entirety for all purposes.

BACKGROUND

Particular embodiments generally relate to systems, circuits, and devices for communicating data signals over increased voltage direct current (DC) power line cables.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In an attempt to simplify the implementation and deployment of data transmission and networking infrastructures, various systems exist for sending data over power transmissions lines. Data transmission systems that use existing power transmission lines and wires for data communication are referred to as power line communication (PLC) systems. PLC systems have the distinct advantage of reducing the cost and complexity associated with deploying, installing, and maintaining separate data transmission wires or fiber optic cable required for other physical connection-based networking systems, such as Ethernet, digital subscriber lines (DSL) or high-speed internet cable or fiber optic systems. However, transmitting and receiving data and power on the same wires or cables presents a particular set of problems and drawbacks.

Figure 1:
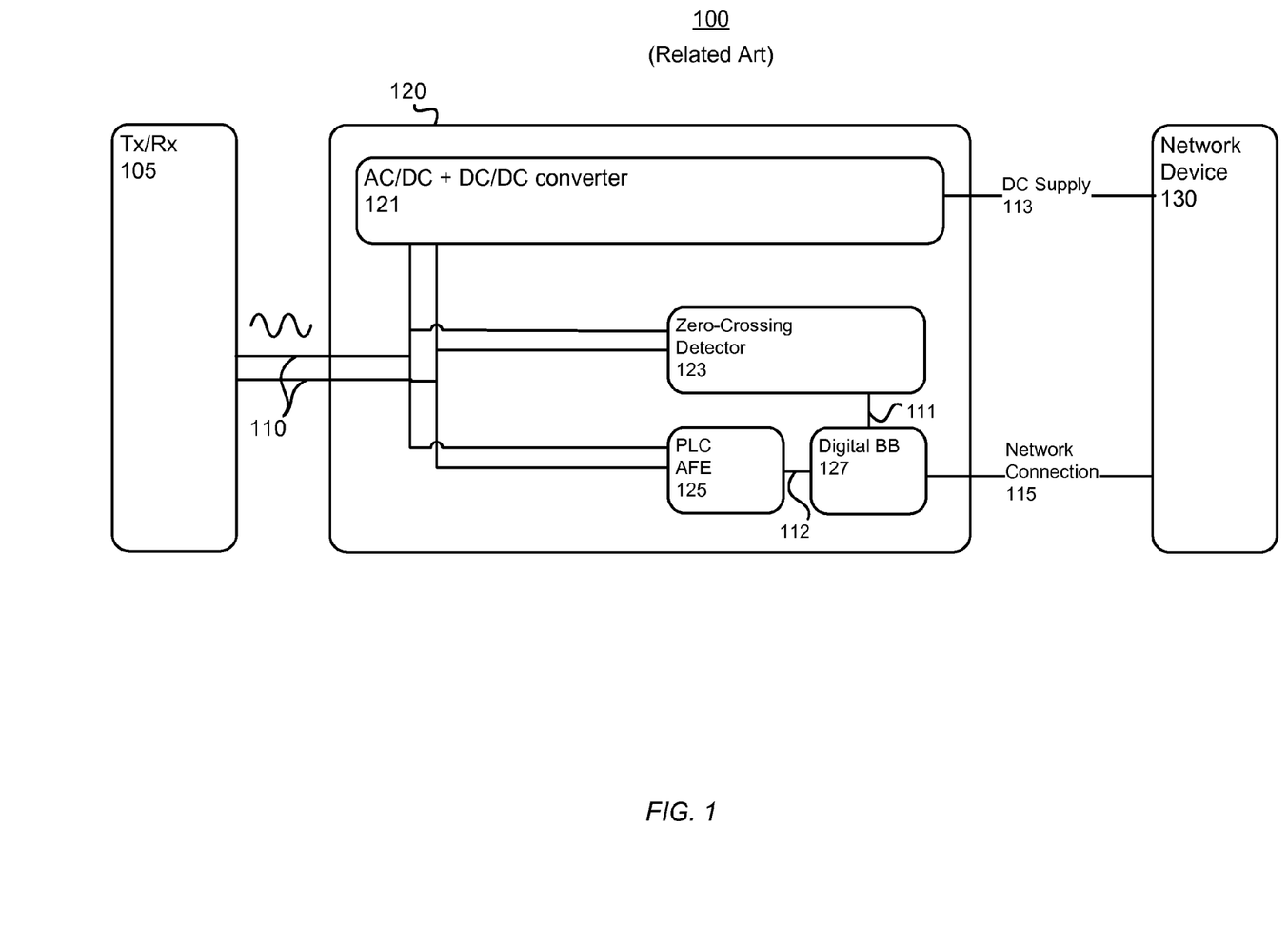
FIG. 1 shows a simplified schematic of one solution for providing power line communications.

For example, receiving data over a power line, such as a conventional household electrical system of wires, breakers, switches and outlets, requires specialized transceivers that can both receive the composite power/data signals and separate or filter the data signal from the alternating current (AC) or the direct current (DC) electrical power delivered at a particular voltage. FIG. 1 shows a simplified schematic of a conventional system 100 for transmitting and receiving data over electrical power lines. As shown, the system 100 includes transmitter/receiver or transceiver 105 coupled to the supply unit 120 via the power wires 110. The power wires are typically the wires of a residential or commercial electrical system and include isolated positive and negative wires. The actual electrical power signal can be generated, transmitted and routed to transceiver 105 by another entity, such as a municipal or private electrical power company. In such systems, the electrical power can be provided in a variety of voltages, currents, and signal types and the transceiver 105 can be coupled to that existing electrical power supply system at a location local or remote to the supply unit 120. Typical household electrical power in North America is provided at approximately 50 Hz AC, 120V and 15 A, while in Europe and Asia, electrical power is provided at 50-60 HZ AC, 220-240V and 10-20 A.

Inside the supply unit 120, is a collection of components used for converting the received electrical power from one voltage to another, from one current to another, and/or from AC to DC, while also detecting any included data signals from the transceiver 105. As shown, supply unit 120 includes an AC/DC and DC/DC converter 121 coupled to power wires 110 to convert the received electrical power to the voltage, current, and type of power required by the network device 130 over DC supply line 113. The supply box 120 also includes a zero-crossing detection module 123 coupled to the power lines 110. The zero-crossing detection module 123 can sense the frequency of an AC power signal by determining the number of times the AC power signal goes from the positive to negative and negative to positive in a given time period. The zero-crossing can be counted or otherwise sensed in both the positive-to-negative direction and negative-to-positive direction, or in only one of the directions. In any scenario, the zero-crossing detector 123 can provide the zero-crossing events to the digital base-band unit 127 over connection 111 data for PLC timing purposes.

Also connected to the power lines 110 is the PLC analog front-end module 125. PLC analog front end module 125 can receive both the electrical power signal and the data signal over the electrical wires 110 from transceiver 105. PLC analog front end module 125 filters the data signal from the electrical power signal. PLC analog front end module 125 sends the data signal filtered from the composite electrical power and data signal to the digital base-band module 127. Digital baseband module 127 can then send a modulated digital data signal to a network device 130 over a network connection 115. Network connection 115 can be any type of data for network communication including, but not limited to USB, Ethernet, IEEE 1394, IEEE 1903, IEEE 1901, and other data and network cables, wires and connections.

Figure 2:
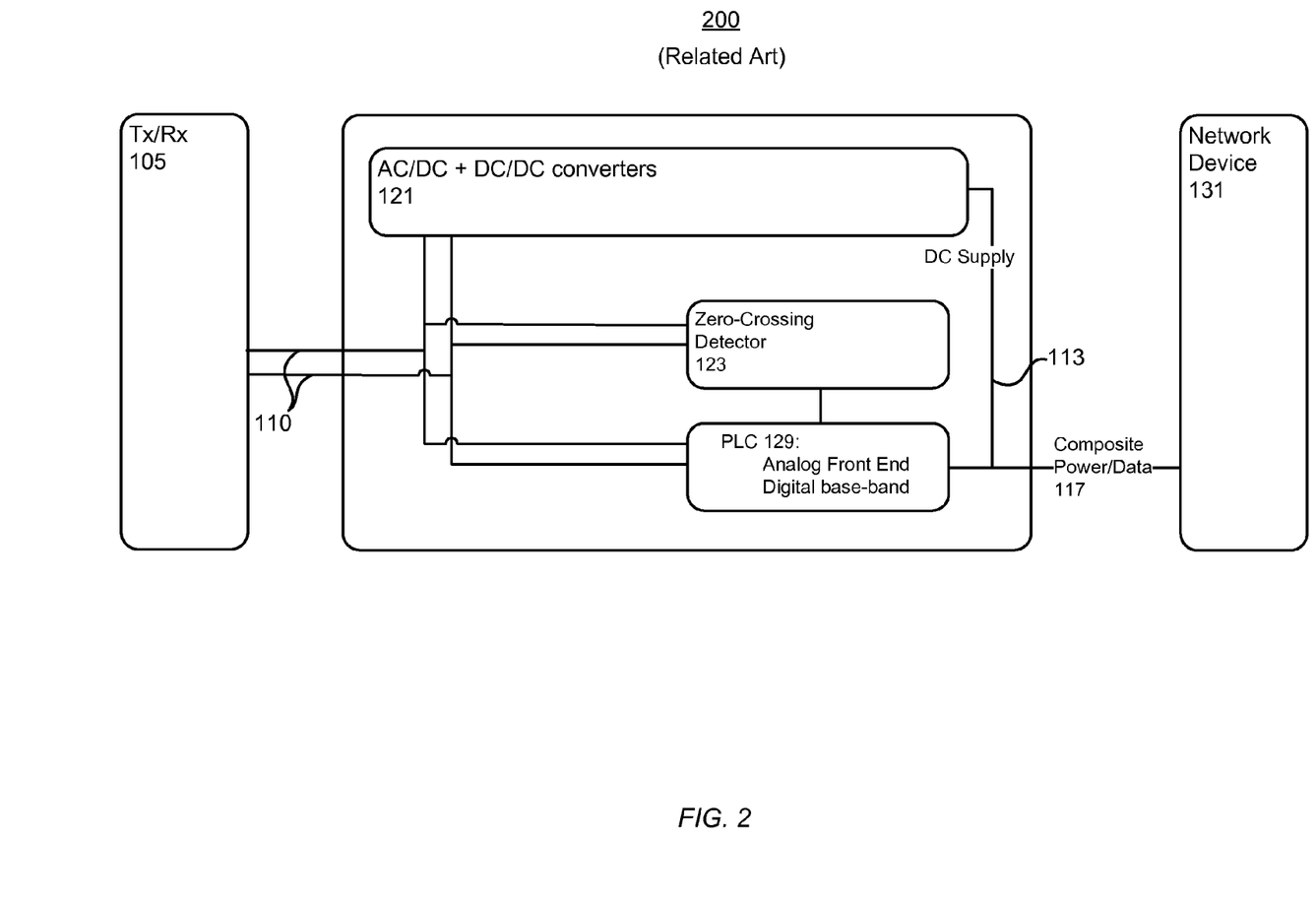
FIG. 2 shows simplified schematic of another solution for providing power line communications.

As can be seen in FIG. 1, to deliver both electrical power signals and data signals from the supply unit 120 to the network device 130 requires two physical wire connections; DC supply connection 113 and network connection 115. To simplify the connection between the supply unit 120 and the network device 130, some conventional solutions have reduced the number of physical wire connections between the supply unit and the network device from two to one. FIG. 2 shows one conventional solution (for example Power-over-Ethernet) for a simplified connection between supply unit 122 and network device 131 that using a single composite power/data connection or cable 117. In such solutions, the converted electrical power signal from AC/DC+DC/DC converter 121 is sent via dc supply connection 113 to be combined with the data signal filtered from the incoming composite electrical power and data signal.

In the example shown, the PLC module 129 includes both the analog front-end and the digital base-band capabilities. The PLC module 129 performs the same functions as PLC front-end module 125 and digital base-band module 127 described in reference to FIG. 1, and then sends the data signal and the zero-crossing data from the zero-crossing detector 123 to the network device 131 that is configured to receive a composite electrical power and digital data signal via composite power/data cable 117. Since power/data cable 117 is usually an Power-over-Ethernet cable, the power supplied is limited to approximately 100 mA. Such limited electrical power is often insufficient especially for many network devices, such as network gateways, network access points, network routers, Internet-enabled or multi-media television set-top boxes, and personal computers, because such devices usually require electrical power with voltages on the order of 1V to 10y.

Drawbacks of using either of the solutions described in reference to FIGS. 1 and 2, stem from the inclusion of the AC/DC or DC/DC power converter 121 and the PLC module functionality in the same physical box as shown in supply units 120 and 122. Inexpensive and mass-produced AC/DC or DC/DC power converter 121 are more often than not the point of failure in supply units such as supply units 120 or 122. The cost of replacing a supply unit can be high based on the fact that the entire supply unit, including the expensive PLC module components, need to be replaced each time the commoditized AC/DC or DC/DC power converter 121 fails. Furthermore, inexpensive AC/DC or DC/DC power converters are often not designed with data communication in mind, so such AC/DC or DC/DC power converters can also generate internal electrical noise that can interfere with the data signal sent to the network device 130 or 131.

SUMMARY

Various embodiments include a power line communication supply having an input/output (I/O) terminal configured to receive a composite electrical power and data input signal. The power line communication supply can include an electrical power signal converter, a power line communication module, and a timing module, each of which is coupled to the I/O terminal. The power line communication supply also includes a composite output terminal coupled to each of the electrical power signal converter, the power line communication module, and the timing module. The composite output terminal can be configured to send, to a network device comprising a power line communication processing module, a composite output signal that includes a converted electrical power signal from the electrical power signal converter, a data signal from the power line communication module, and a timing data signal from the timing module.

Other embodiments include a network device having a composite input/output (I/O) terminal and a power line communication processing module configured to receive, via the composite I/O terminal, a composite direct current (DC) electrical power and data signal from a power line communication supply. The power line communication supply includes an input/output (I/O) terminal configured to receive an alternating current (AC) electrical power and power line communication data input signal from a transmitter. The power line communication supply also includes an electrical power signal converter, a power line communication module, and a timing module, each of which is coupled to the I/O terminal. The power line communication module further includes a composite output terminal coupled to the electrical power signal converter, the power line communication module, the timing module, and the composite I/O terminal of the network device.

Another embodiment includes a system having a network device that includes a composite input/output (I/O) terminal, and a power line communication processing module configured to receive, via the composite I/O terminal, a composite direct current (DC) electrical power, and data signal. Such embodiments also include a power line communication supply having an input/output (I/O) terminal configured to receive an alternating current (AC) electrical power and power line communication data input signal from a transmitter. Such a power line communication supply also includes an electrical power signal converter, a power line communication module, and a timing module, each coupled to the I/O terminal. The power line communication supply further includes a composite output terminal coupled to the electrical power signal converter, the power line communication module, the timing module, and the composite I/O terminal of the network device.

The following detailed description and accompanying drawings provide a more detailed understanding of the nature and advantages of the present invention.

DETAILED DESCRIPTION

Described herein are techniques for systems, devices and methods for providing simplified power line communications. In the following description, for purposes of explanation, numerous examples and specific details are set forth in order to provide a thorough understanding of embodiments of the present disclosure. Particular embodiments as defined by the claims may include some or all of the features in these examples alone or in combination with other features described below, and may further include modifications and equivalents of the features and concepts described herein.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Figure 3:
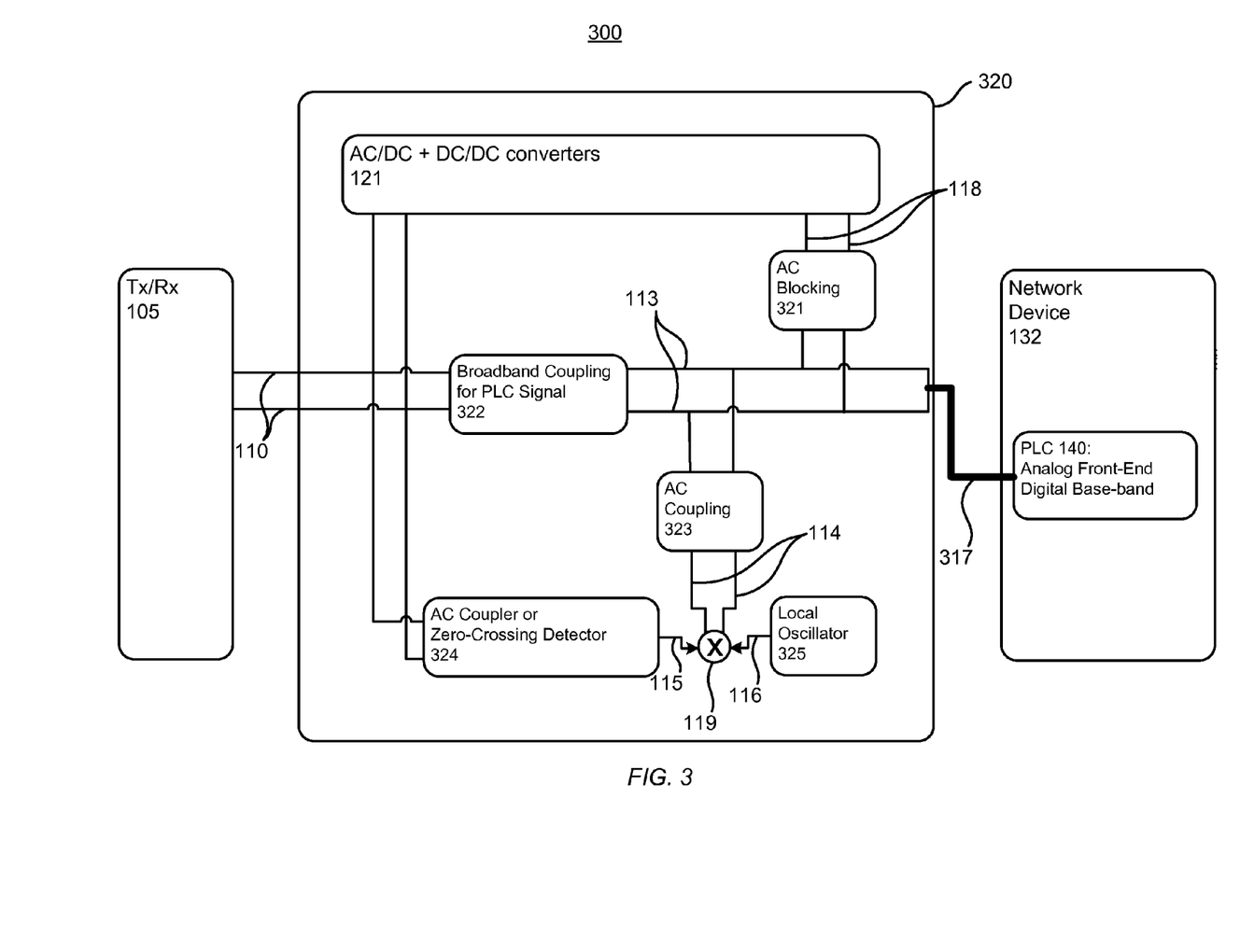
FIG. 3 shows a simplified schematic of a system for providing power line communications according to one embodiment.

FIG. 3 shows a schematic of a system 300 for providing simplified power line communication (PLC) with increased systematic reliability and reduced maintenance/replacement costs according to various embodiments of the present disclosure. System 300 includes a transceiver 105 for sending electrical power signals and data signals over electrical power wires 110 to supply unit 320. Supply unit 320 can convert the electrical power signal from the transceiver 105 to a form required by the associated network device 132, to which it is coupled by composite electrical power and data cable 317, which can be a single cable with only 2 wires. Supply unit 320 can also receive and forward the data signal over composite electrical power and data cable 317 to network device 132. In related embodiments, the supply unit 320 can detect the frequency at which the received AC electrical power signal crosses zero as it alternates between positive and negative voltages and send such zero-crossing data to the network device 132. In such embodiments, the converted composite electrical signal, the detected data signal, and the zero-crossing data can be combined and sent to the network device 132 via composite electrical power and data cable 317.

In some embodiments, the transceiver 105 is a device that can be situated at a remote location, such a power generation or relay station, while in other embodiments, the transceiver can be situated at the same site as the supply unit 320 and network device 132, such as in a residential or commercial building. In such embodiments, the transceiver can be coupled to the electrical power transmission wires 110 and configured to transmit and receive digital or analog data signals at frequencies separated or otherwise isolated from the frequency of the AC electrical power signal. Accordingly, transceiver 105 can include appropriately configured devices used in the deployment of high-speed internet access, residential and commercial networking, as well as high quality media broadcasting. In networking embodiments, transceiver 105 can be another PLC network device.

As shown, supply unit 320 can include an number of internal components or modules for receiving, processing, analyzing, converting and retransmitting the received composite electrical power and data signal to a network device 132. For example, supply unit 320 can include an electrical power signal converter 121 coupled to the electrical power wires 110. The converter 121 can be configured to receive and convert the electrical power signal from the transceiver 105. In such embodiments, the converter 121 can be configured to convert an AC electrical power signal to a direct current (DC) electrical power signal, convert a received DC electrical power signal to another DC electrical power signal. In converting the received electrical power signal, the converter 121 can change or condition the voltage, current, or alternating frequency to a form required or expected by a network device 132.

Also shown in supply unit 320, is a broadband coupling module 322, coupled to the electrical power wires 110, for receiving and processing the PLC data signal. The broadband coupling module 322 can also be configured to up or down convert the received PLC data signal based on requirements of system 300 or network device 132. For example, network device 132 might be configured to detect and process data signals in a frequency spectrum higher or lower than that in which the original PLC data signal was transmitted from transceiver 105. Similarly, broadband coupler 322 can also be configured to boost or otherwise amplify the received PLC data signal. Broadband coupling module 322 can then transmit the PLC data on wires 113 to combine the PLC data signal with the converted electrical power signal and timing data extracted from the received composite electrical power and data signal by zero-crossing detector 324 and/or local oscillator 325.

Figure 4:
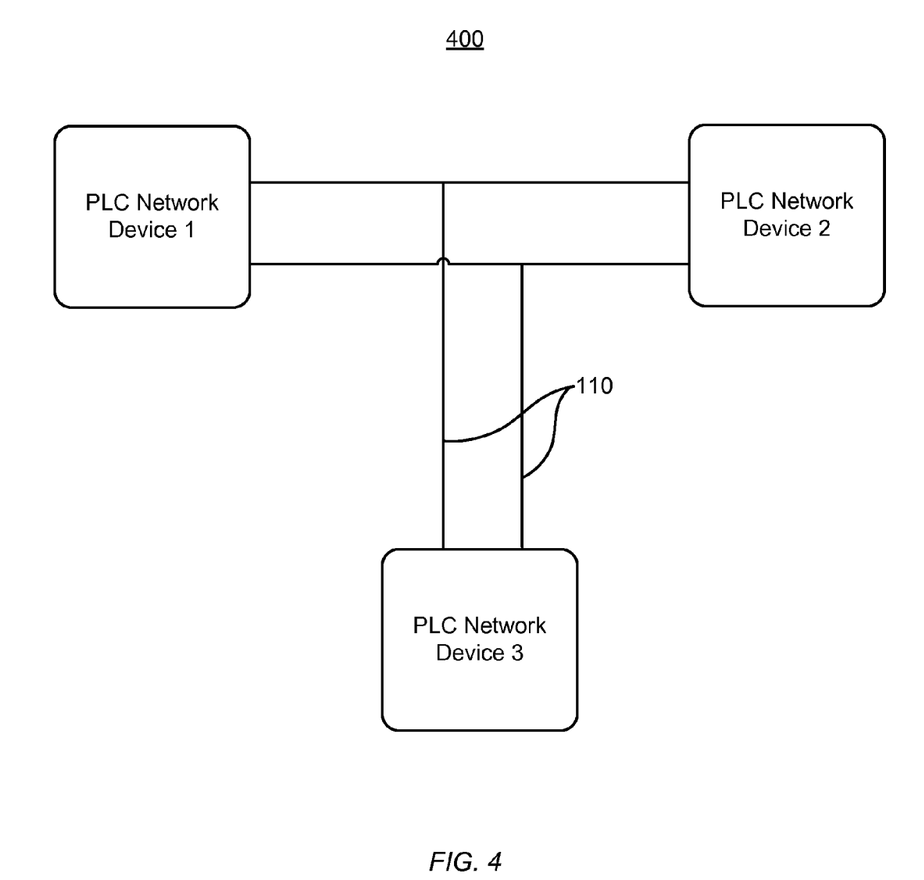
FIG. 4 shows a simplified schematic of a network that can be implemented using various embodiments.

In some embodiments, network device 132 can synchronize data transmission and reception with other PLC network devices connected in a network configuration over electrical power transmission wires or cables, like the network shown in FIG. 4. In the network 400 shown in FIG. 4, multiple PLC network devices, like supply unit 320 in combination with network device 132, can be connected to one another via a network of electrical power transmission wires 110. In such networks each device can use the characteristics of an electrical power signal that exists on the electrical power transmission wires 100. Specifically, in some embodiments, each PLC network device can determine the frequency at which the AC electrical power signal crosses 0V as it alternates from positive to negative voltages.

Figure 5:
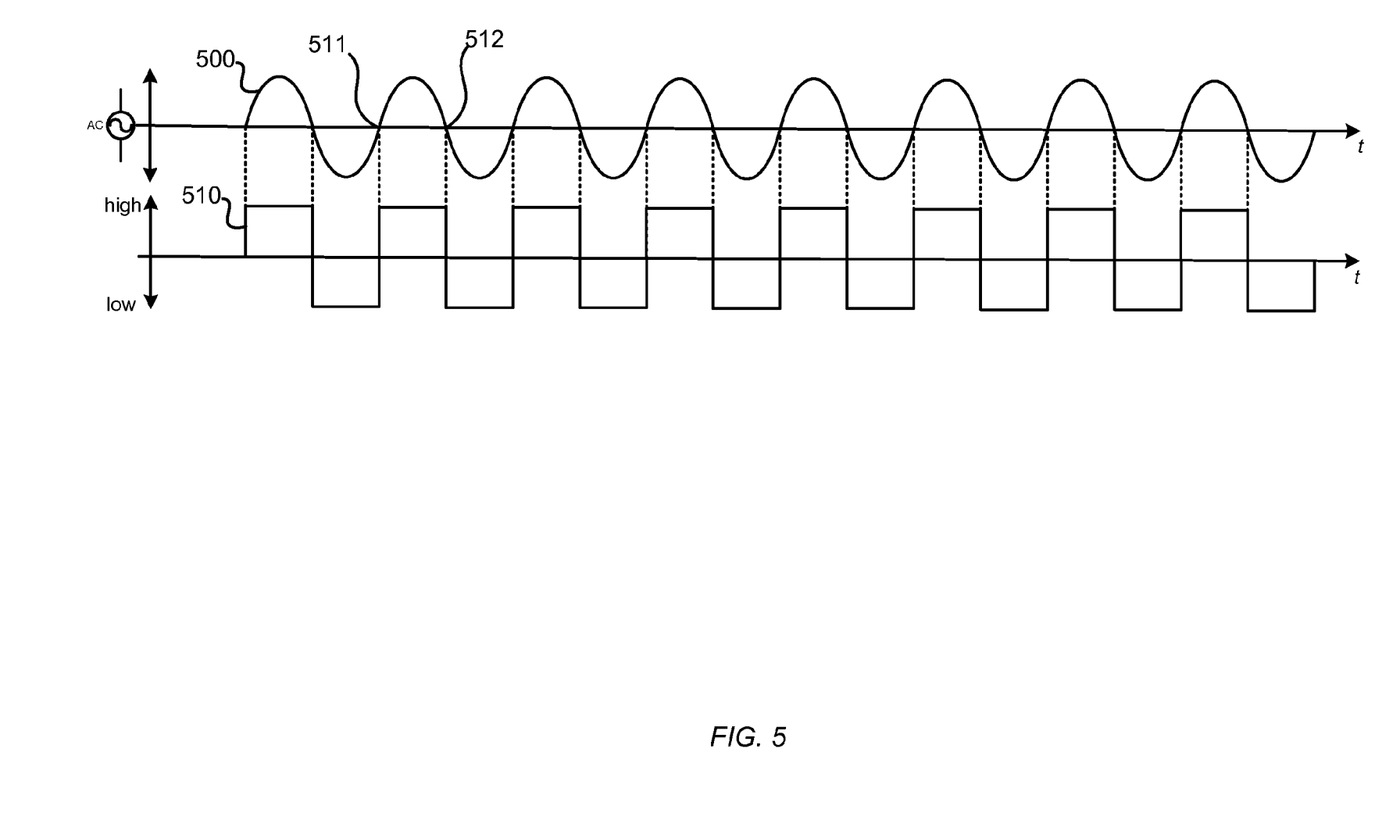
FIG. 5 shows a waveform of an alternating current (AC) electrical power signal and an associated zero-crossing digital waveform or data that can be used in various embodiments.

FIG. 5 show an example of a how an AC electrical power signal 500 can be detected and used to generate a digital timing signal 510 that can be used by networked PLC network devices to synchronize or organize data communications over new and existing electrical power transmission lines. As the voltage of AC electrical power signal 500 crosses from negative to positive at point 511, digital timing signal 510 can be made to go "high" or positive, and when the voltage of the AC electrical power signal 511 goes from positive to negative at point 512, the digital timing signal 510 can be made to go "low" or negative. As shown, the digital timing signal 510 can be made to go high on the rising edge zero-crossing of the AC electrical power signal 500, but in other embodiments, the digital timing signal 510 can be made to go high on falling edge zero-crossing. Accordingly, in either such determinations of the AC electrical power signal 500 zero-crossings, the digital timing signal 510 can be used as the zero-crossing data by the AC coupler or zero-crossing detector 324 shown in FIG. 3.

In alternative embodiments, AC coupler or zero-crossing detector 324 can generate an attenuated version or image of the AC electrical power signal. This attenuated AC electrical power signal is an lower amplitude image of the AC electrical power signal which can then be used as the timing information sent in the composite electrical power and data cable to the network device 132 coupled to the supply unit 320.

In some embodiments, the zero-crossing detector 324 can detect the zero-crossing frequency from the received AC electrical power signal and generate the digital timing signal or the AC electrical signal image and send either of such signals to AC coupling module 323 via connection 115, modulator 119, and connection 114. In such embodiments, the digital timing signal or the AC electrical power signal image is sent at the original or natural frequency determined directly from the AC electrical power signal. In other embodiments, however, it is desirable to shift the frequency of the digital timing signal or the AC electrical power signal image to avoid interference with the PLC data signal provided by the broadband coupling module 322.

For example, where the PLC data signal provided by the broadband coupling module 322 can have a range of frequencies, the digital timing signal or the AC electrical power signal image can be multiplied using modulator 119 with an numerically controlled oscillating signal from local oscillator 325 via connections 116. Depending on the spacing of the range of frequencies of the PLC data signal, the 0 Hz converted DC electrical power signal and other signals potentially included on the AC electrical power transmission wires, the timing signal, either a digital timing signal determined from the zero-crossings of the received AC electrical power signal or an attenuated image of the AC electrical power signal, can be frequency shifted to be above or below the PLC data signal frequency range to avoid interference.

The PLC data signal from broadband coupling module 322, the timing signal from AC coupler or zero-crossing detector 324, and the converted DC electrical power signal from converter 121 can be combined on wires 113 and then transmitted to network device 132 via composite cable 317. Network device 132 can include a PLC module 140. In some embodiments, the PLC module 140 can be a single integrated circuit that performs both the analog front-end and digital base-band functions for sending and receiving PLC data signals over the composite cable 317. In other embodiments, the PLC module 140 can include a number of electronic components or integrated circuits to perform the analog front-end and digital base-band functions. In related embodiments, the PLC module 140 can also handle receiving and distributing the DC electrical power received on the composite cable 317.

Such PLC module 140 equipped networks devices 132 can be network gateways, television set-top boxes for delivering data and media to one or more televisions, and other standalone network devices such as personal computers and server computers. An advantage of system 300 includes the configuration show in FIG. 3 that separates converter 121 from being in the same housing or enclosure as PLC module 140. The separation of converter 121 from PLC module 140 not only simplifies setup of the system and avoids any potential electrical interference between the two modules, but also provides for a supply unit 320 with a reduced bill of materials and, accordingly, a reduced cost of replacement in the event that the commoditized converter 121 fails.

Figure 6:
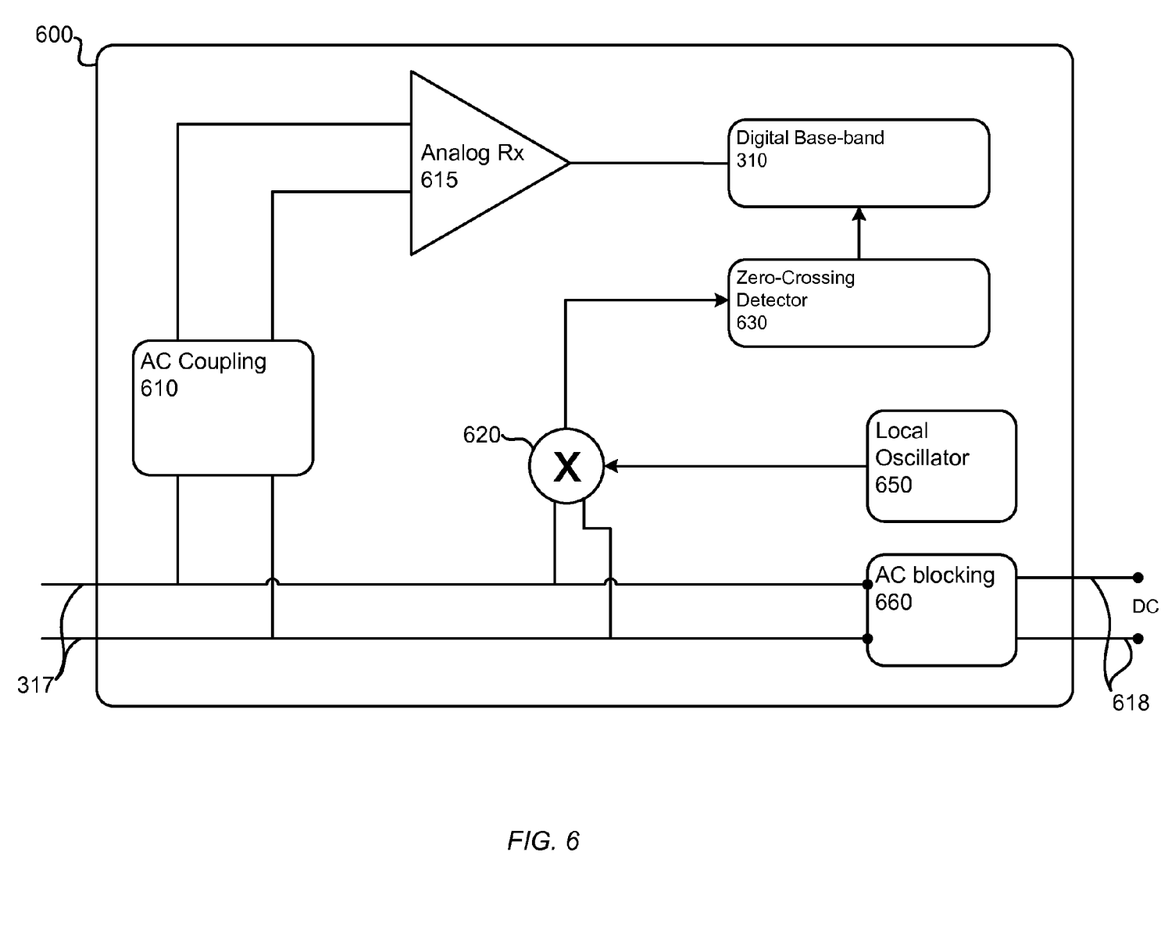
FIG. 6 shows a simplified schematic of a network device for use in power line communications according to various embodiments.

Exemplary embodiments of network devices configured for receiving composite PLC data, DC electrical power, and timing composite signals will now be discussed. FIG. 6 shows a simplified schematic of a network device 600 that can be used in combination with supply units that provide attenuated AC electrical power signal images as a timing information signals in the composite power/data signal sent over a composite cable, according to various embodiments of the present disclosure. As shown the composite signal is received over composite cable 317. AC coupling module 610 can couple the analog receiver 615 to the incoming composite signal. The AC electrical power signal image is frequency shifted up or down using the multiplier 620 that references local oscillator 650. The frequency shifted AC electrical power signal image can then be sent to zero-crossing detector 630 to generate a timing signal as in conventional PLC solutions. The digital based module 640 can then use the timing signal from zero-crossing detector 630 to decode the PLC data signal received via AC coupling module 610 and analog receiver 615. Meanwhile, the AC blocking module 660 can filter out any alternating current signals and provide the converted DC electrical power signal to the rest of the components internal and external to the to the network device 600 on wires 618.

Figure 7:
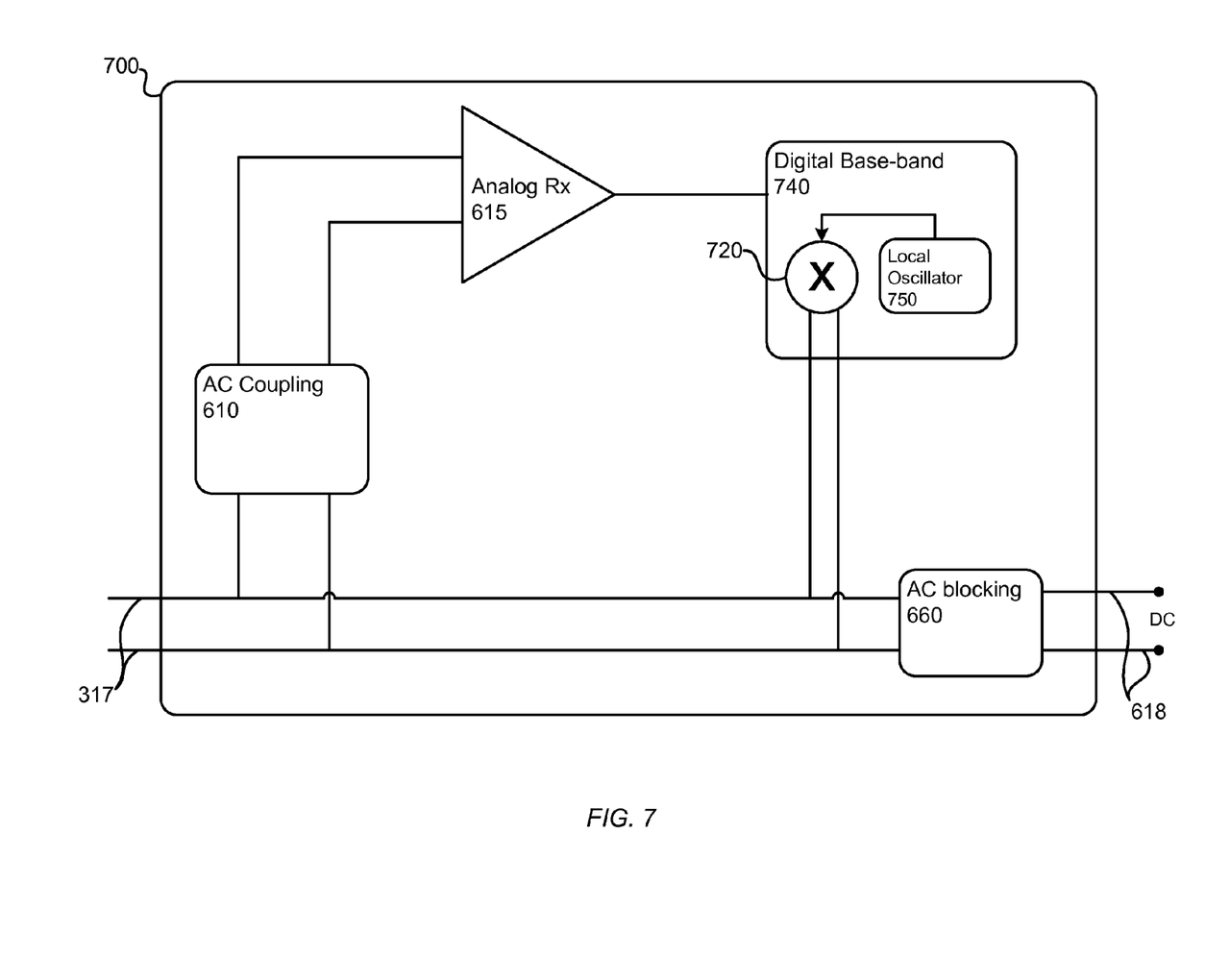
FIG. 7 shows a simplified schematic of a network device for use in power line communications according to various embodiments.

FIG. 7 shows a simplified schematic of a network device 700 that can be used in combination with supply units that provide a digital timing data as a timing information signal in the composite signal sent over a composite cable, according to various embodiments of the present disclosure. In such embodiments, the composite signal is sent through the reception chain that includes the AC coupling module 610 and the analog receiver 615 and the digital timing signal is extracted in the digital base-band module 740 in reference to an internal local oscillator 750 and multiplier 720. In such embodiments, the local oscillator 750 can be a numerically-controlled oscillator (NCO).

Figure 8:
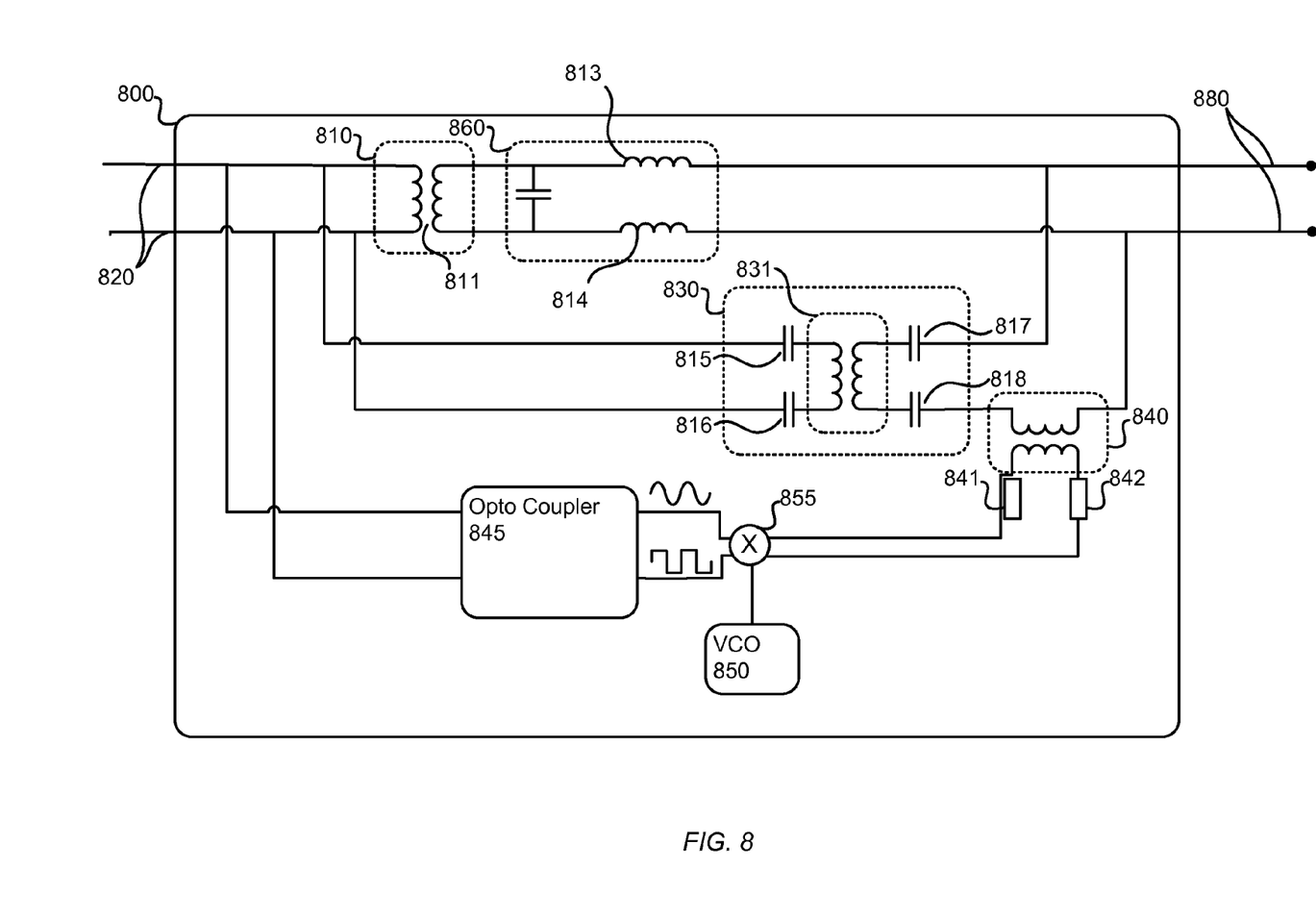
FIG. 8 shows a schematic of a supply unit for providing power line communications according to various embodiments.

FIG. 8 shows a schematic of a supply box 800 according to an embodiment of the present disclosure. As shown, supply box 800 includes an AC/DC supply 810 that can include transformer 811. While not shown in FIG. 8, the AC/DC supply 810 can be configured to provide additional regulation and filtering. The output of the AC/DC supply 810 is a DC electrical power signal. To reduce high frequency noise in the output DC electrical power signal, each terminal of transformer 810 can be coupled to the terminals of capacitor 812 that can then be coupled to one of inductors 813 and 814 as shown in box 860. The inductors 813 and 814 provide high impedance for high frequency noise in the output DC electrical power signal. The converted and filtered output DC electrical power signal can then be fed into the composite cable 880.

Also connected to the incoming AC electrical power and PLC data signal on connection 820 is the PLC transfer circuit 830. PLC transfer circuit 830 can include capacitors 815, 816, 817, and 818 and a transformer 831 connected to one another as shown FIG. 8. Capacitors 815 and 816 couple the input terminals of transformer 831 to the incoming composite AC electrical power signal wires 820. The capacitors 817 and 818 couple the output terminals of transformer 831 to the composite cable 880 to include the PLC data signal in the composite output PLC electrical power and data signal. The inclusion of capacitors 817 and 818 ensures that output of AC/DC converter circuit 810 does not short circuit with the input composite AC PLC electrical power and data signal. The capacitors 817 and 818 can be sized to avoid any attenuation in the PLC node fall off frequency. The step ratio of the transformer 831 can include any number of step-up and step-down ratios. For various embodiments of the present disclosure, the step ratio of the transformer 831 can be one-to-one.

The other circuit or module that can be included in the supply unit 800 is for determining and/or generating the timing data that can be sent to the intended network device over composite cable 880 in a manner analogous to the functionality described in reference to AC coupler or zero-crossing detector 324. As shown, opto-coupler 845 is also coupled to the incoming input PLC AC electrical power and data signal. The opto-coupler 845 can generate an attenuated AC electrical power signal image (i.e. a low amplitude sinusoidal AC signal having the same zero-crossing frequency as the AC electrical power signal on wires 820). In other embodiments, the opto-coupler can generate a digital timing signal (i.e. a square-wave signal in which the signal goes high or low when the incoming AC electrical power signal crosses over from positive to negative). In either scenario, the opto-coupler 845 can send the timing data signal to mixer 855 where it can be mixed, up-converted or down-converted to a frequency above or below the frequency range of the PLC data signal to avoid interference using a signal provided by voltage controlled oscillator (VCO) 850. The timing data signal can then be added to composite cable 880 via transformer 840. Accordingly, composite cable 880 can carry a composite electrical power and data signal that includes, the DC electrical power signal, the PLC data signal and the timing data signal.

Figure 9:
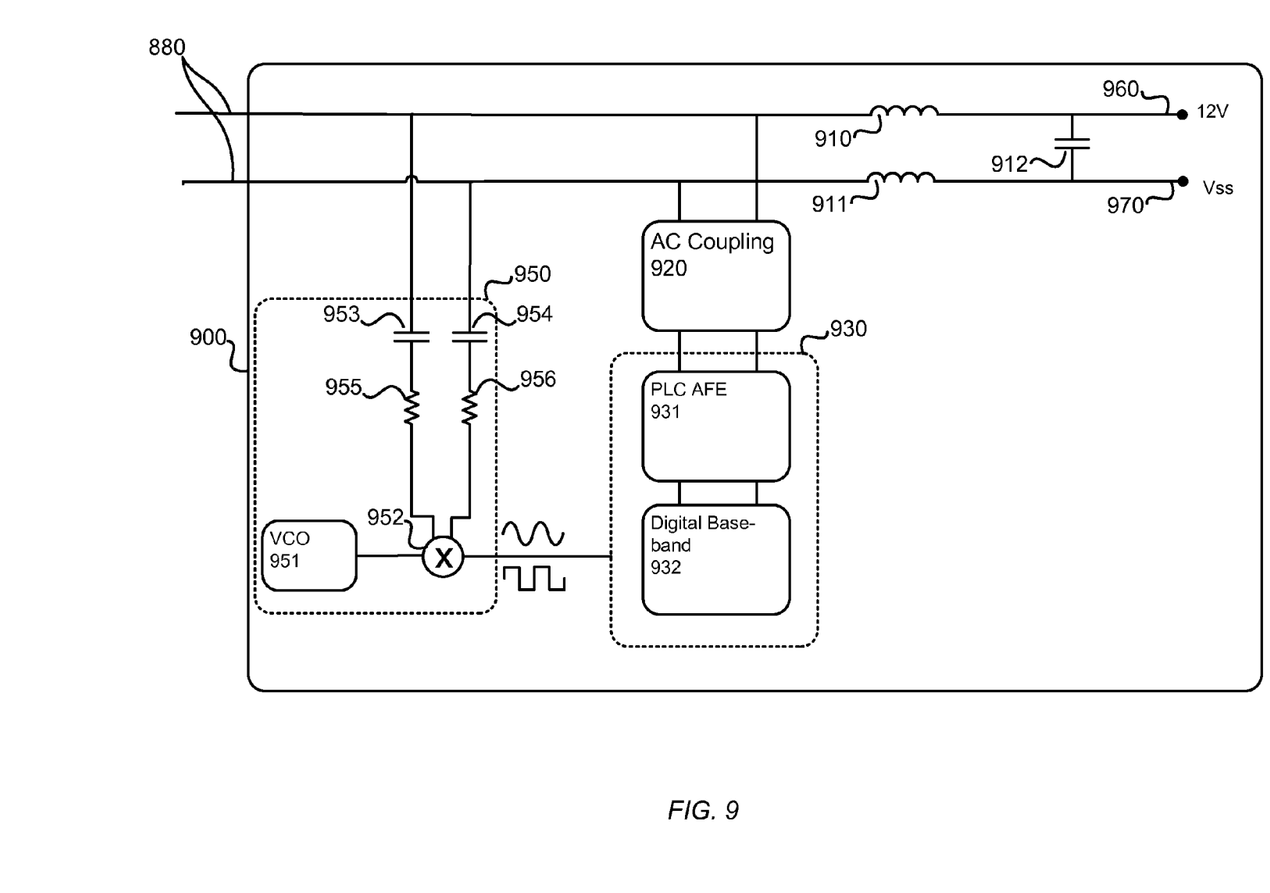
FIG. 9 shows a schematic of a network for receiving power line communications according to various embodiments.

Composite cable 880 can then be connected to a network device such as network device 900 shown in FIG. 9. According to some embodiments, network device 900 can extract the DC electrical power signal received from composite cable 880 using inductors 910 and 911 and capacitor 912. For example, the internal components can be powered by the 12V DC signal on wire 960 and reference the Vss on 970. While 12V DC is a typical voltage for many network devices, other voltages can be used without deviating from the spirit and scope of the present disclosure.

Network device 900 can also include an AC coupling module 920 to extract the PLC data signal from the received composite cable 880. In some embodiments, the AC coupling module 920 comprises a pair of capacitors or a transformer to relay the PLC data signal to the PLC module 930. The AC coupling module 920 can then send the PLC data signal to PLC module 930. PLC module 930 can include a number of components on one or more integrated circuits.

As shown, PLC module 930 can include a PLC analog front-end module 931 and a digital bas-band module 932. The PLC analog front-end and digital base-band can be used to receive and send PLC data signals over composite cable 880. In some embodiments, the PLC module 930 can send and receive PLC data signals in synchronization with other network devices on a PLC time division multiple access (TDMA) network.

The PLC module 930 can reference timing data from timing circuit 950. In PLC TDMA networks, all of the network devices can be synchronized by the AC electrical power signal cycle, as represented by the zero-crossing digital timing signal or attenuated AC electrical power signal image, discussed above. In some embodiments of PLC TDMA networks, a beacon sending station (BSS) manager can periodically send a beacon message to all of the network devices with various of network information.

For example, a BSS manager can send out beacon signals or messages with network information, such as contention free periods and time slot distributions between the network devices to exchange the data. Since BSS manager is the network time reference, it is beneficial for the all the network devices on a PLC TDMA network to be synchronized with BSS manager. After the transmission of beacon message signal, the PLC TMDA network can include a carrier sensing multiple access time (CSMA) time slot in which new stations that are not yet synchronized with the BSS manager can transmit request messages in order to join the PLC TDMA network. After the CSMA time slot, there is a TDMA time slot during which network devices on the PLC TDMA network can exchange data. A PLC network time period including the time for beacon message to be sent, the CSMA time slot, and the TDMA time slot can be defined in terms of the number of AC electrical signal cycles. For example, in some embodiments, the PLC network time period can occur within two AC electrical power signal cycles. Two AC electrical power signal cycles can be defined as occurring between an zeroth zero-crossing and a fourth zero-crossing. In such embodiments, the PLC network time period can include a predetermined or fixed time offset after the zeroth zero-crossing and the beacon message signal is sent.

Timing circuit 950 includes two capacitors 953 and 954 coupled to composite cable 880 and disposed in series with resistors 955 and 956 to couple the composite AC electrical power and PLC data signal to mixer 952 and the PLC module 930. The timing circuit 930 can also include a voltage controlled oscillator 951 that can be used in combination with mixer 952 to provide an up-converted or down converted timing signal to PLC module 930 to avoid interference with the Inductor 814 can be coupled to a capacitor 817 that is also coupled to an output terminal of transformer 830. In other embodiments, more noise filters like the circuit in box 860 can be included in multiple stages to further reduce any high frequency noise the output DC electrical power signal.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A power line communication supply comprising:
    an input/output (I/O) terminal configured to receive a composite electrical power and data input signal;
    an electrical power signal converter coupled to the I/O terminal;
    a power line communication module coupled to the I/O terminal, the power line communication module configured to detect a data signal from the composite electrical power and data input signal;
    a timing module coupled to the I/O terminal, the timing module configured to detect a timing data signal from the composite electrical power and data input signal and to shift the timing data signal effective to avoid interference with the data signal; and
    a composite output terminal coupled to each of the electrical power signal converter, the power line communication module, and the timing module, the composite output terminal configured to send, to a network device comprising a power line communication processing module, a composite output signal comprising i) a converted electrical power signal from the electrical power signal converter, ii) the data signal from the power line communication module, and iii) a shifted timing data signal from the timing module, the shifted timing data signal effective to avoid interference with the data signal.

2. The power line communication supply of claim 1, wherein the composite electrical power and data input signal comprises an alternating current (AC) electrical power signal, and wherein the electrical power signal converter converts the AC electrical power signal into the converted electrical power signal comprising a direct current (DC) electrical power signal.

3. The power line communication supply of claim 2, further comprising a local oscillator coupled to the timing module, wherein the timing module is configured to determine a frequency of the AC electrical power signal.

4. The power line communication supply of claim 3, wherein the timing module is configured to shift the frequency of the AC electrical power signal using an output frequency from the local oscillator.

5. The power line communication supply of claim 4, wherein the frequency of the AC electrical power signal comprises a frequency at which the AC electrical power signal crosses 0 volts.

6. The power line communication supply of claim 5, wherein the timing data signal comprises the frequency at which the AC electrical power signal crosses 0 volts.

7. The power line communication supply of claim 4, the frequency of the AC electrical power signal comprises a cycle frequency of the AC electrical power signal.

8. The power line communication supply of claim 7, wherein the timing module is further configured to generate an attenuated image of the AC electrical power signal having the frequency of the AC electrical power signal.

9. The power line communication supply of claim 1, wherein the power line communication module is configured to:
    receive a second data signal from the power line communication processing module of network device via the composite output terminal; and
    transmit the second data signal on the I/O terminal.

10. The power line communication supply of claim 1, wherein the composite output terminal is the only connection between the power line communication supply and the network device.

11. The power line communication supply of claim 1, wherein the network device is a device selected from the group consisting of a network gateway, a multi-media television set-top box, and a personal computer.

12. The power line communication supply of claim 1, wherein the converted electrical power signal from the electrical power signal converter comprises a direct current electrical power signal having a current greater than 500 milliamps.

13. The power line communication supply of claim 1, wherein a frequency of the timing data signal is shifted to be above or below a frequency of the data signal.

14. A network device comprising:
a composite input/output (I/O) terminal; and
a power line communication processing module configured to receive, via the composite I/O terminal, a composite direct current (DC) electrical power and data signal from a power line communication supply, the power line communication supply comprising:
an input/output (I/O) terminal configured to receive an alternating current (AC) electrical power and power line communication data input signal from a transmitter,
an electrical power signal converter coupled to the I/O terminal,
a power line communication module coupled to the I/O terminal, the power line communication module configured to detect a data signal from the AC electrical power and power line communication data input signal,
a timing module coupled to the I/O terminal, the timing module configured to detect a timing signal from the AC electrical power and power line communication data input signal and shift the timing signal effective to avoid interference with the data signal, and
a composite output terminal coupled to each of the electrical power signal converter, the power line communication module, the timing module, and the composite I/O terminal of the network device, the composite output terminal configured to send the composite DC electrical power and data signal, the composite DC electrical power and data signal comprising i) a converted electrical power signal from the electrical power signal converter, ii) the data signal from the power line communication module, and iii) a shifted timing data signal from the timing module, the shifted timing data signal effective to avoid interference with the data signal.

15. The network device of claim 14 wherein the power line communication processing module comprises an analog front-end integrated circuit coupled to a digital base-band integrated circuit.

16. The network device of claim 14 wherein the power line communication processing module comprises a single integrated circuit that performs analog front-end and digital base-band functionality.

17. The network device of claim 14, wherein the power line communication processing module is further configured to send, via the composite I/O terminal and the power line communication supply, an output signal to another network device.

18. The network device of claim 14, wherein a DC electrical power signal is generated from the AC electrical power and power line communication signal by the electrical power signal converter.

19. The network device of claim 14, wherein the composite I/O terminal of the network device is coupled to the composite output terminal of the power line communication supply via a single composite cable.

20. A system comprising:
a network device comprising
a composite input/output (I/O) terminal, and
a power line communication processing module configured to receive, via the composite I/O terminal, a composite direct current (DC) electrical power and data signal; and
a power line communication supply comprising an input/output (I/O) terminal configured to receive an alternating current (AC) electrical power and power line communication data input signal from a transmitter,
an electrical power signal converter coupled to the I/O terminal,
a power line communication module coupled to the I/O terminal, the power line communication module configured to detect a data signal from the AC electrical power and power line communication data input signal,
a timing module coupled to the I/O terminal, the timing module configured to detect a timing signal from the AC electrical power and power line communication data input signal and shift the timing signal effective to avoid interference with the data signal, and
a composite output terminal coupled to each of the electrical power signal converter, the power line communication module, the timing module, and the composite I/O terminal of the network device, the composite output terminal configured to send the composite DC electrical power and data signal, the composite DC electrical power and data signal comprising i) a converted electrical power signal from the electrical power signal converter, ii) the data signal from the power line communication module, and iii) a shifted timing data signal from the timing module, the shifted timing data signal effective to avoid interference with the data signal.

* * * * *